April 5, 1960     E. E. LEWIS     2,931,375
GOVERNOR FOR CONSTANT SPEED DRIVES
Filed Jan. 2, 1957     2 Sheets-Sheet 1

Inventor:
Ernest E. Lewis,
by Roe D. McBurnett
His Attorney.

April 5, 1960   E. E. LEWIS   2,931,375
GOVERNOR FOR CONSTANT SPEED DRIVES
Filed Jan. 2, 1957   2 Sheets-Sheet 2
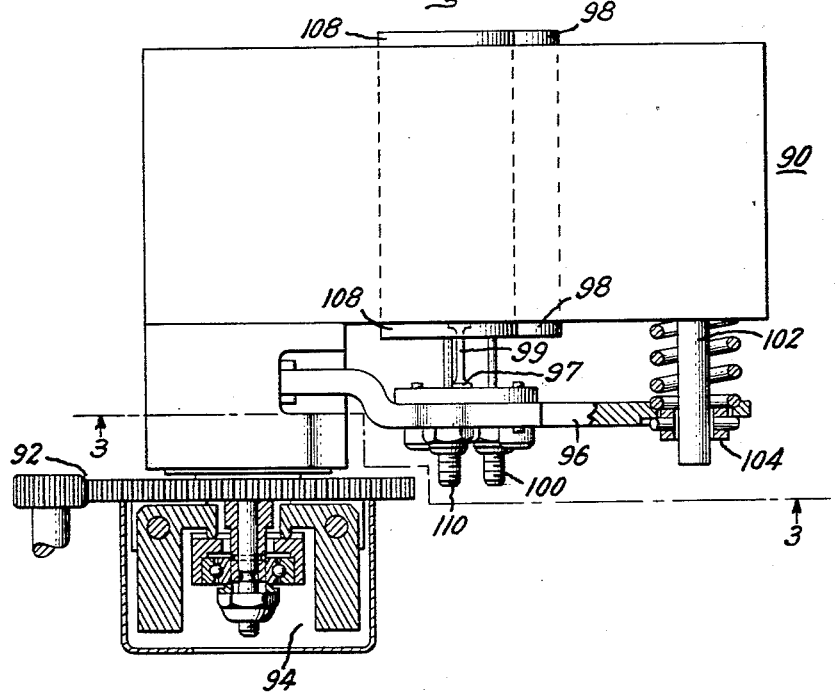
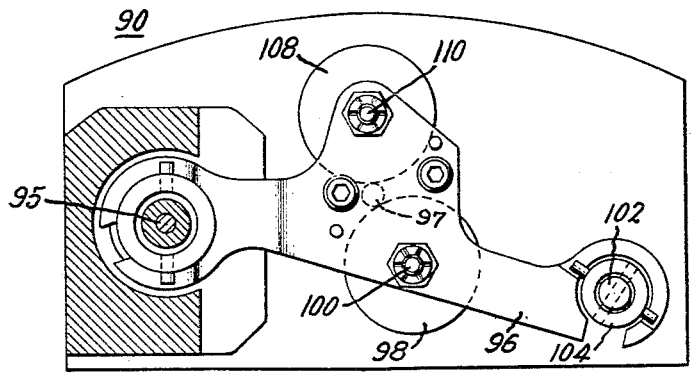
Inventor:
Ernest E. Lewis,
by Roe D. McBurnett
His Attorney.

United States Patent Office

2,931,375
Patented Apr. 5, 1960

2,931,375

GOVERNOR FOR CONSTANT SPEED DRIVES

Ernest Eber Lewis, Scotia, N.Y., assignor to General Electric Company, a corporation of New York Application January 2, 1957, Serial No. 632,066

2 Claims. (Cl. 137—58)

The present invention relates to a governor for constant speed drives and more particularly to a governing system for controlling the speed of prime movers, power drive transmissions, constant speed drives, air turbines, and the like.

It is already known to use flyweight speed sensing means which directly move or actuate a main control valve or a solenoid operated valve to govern the speed of a prime mover, or of a similar type of a governed unit or system. In general, presently known methods are not endowed with stabilizing means, or, if used at all, comprises a lag-lead dash-pot method. These various approaches do not allow for greater accuracy and improved response at the same time. Further, these methods are very temperature sensitive and generally cannot be used for wide temperature range aircraft conditions.

The present invention provides a governor sensing device that may sense speed, pressure, or temperature errors in the governed unit, so that when an error from a predetermined unit or level is sensed, the governor will react to supply control fluid to a control piston, or the like, located on the unit. In this manner, the speed or drive ratio of the governed unit can be corrected and maintained at a predetermined level. This present governing system can be referred to as a lead-lag valve-piston method which is distinguished by a consistency of operation and speed of response for a very wide range of speed ratios and time constants of any given governed unit.

Hence, this present system gives greater response and greater accuracy over previously utilized governing methods, and gives consistent characteristics over a wide range of fluid viscosities which previously were not readily obtainable. In this manner, consistent system characteristics are achieved and obtained even if such parameters as the drive gain and time constants of the governed system are changed. Also, the system is so constructed that values of system constants may very easily be changed by slight structural changes or modifications, such as a change of pivot location in the structural manifestation of the present invention, as hereinafter disclosed. Further, the invention can be utilized for a large number of various applications with only minor adjustments in structural dimensions and in the resultant action of the mechanism to the sensed errors in speed, pressure, or temperature.

The governing system is also adapted for the inclusion of electrical trim signals paralleling the speed, pressure or temperature errors, to govern at the desired point in the particular network utilized. In brief, the present system is very compact, and light weight due to a unitary structural configuration and linkage arrangement which eliminates bulky and expensive components generally found in presently known systems.

An object of the present invention is the provision of a speed governing system for controlling the speed of drive or driven units in response to either speed, pressure, or temperature errors, or a combination thereof, sensed from these units.

Another object is to provide a governing system having a speed, pressure, or temperature error sensing mechanism in combination with the speed governor of the governed unit.

A further object of the invention is the provision of a governing system adapted to sense error signals from the governed unit, and operate entirely by mechanical or electrical input signals, or combination of both.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 2 is a modification of the device of Figure 1, showing a more compact governing system;

Figure 3 is a sectional view of the device taken along the line 3—3 of Figure 2, showing the details of the speed governor.

Figure 1:
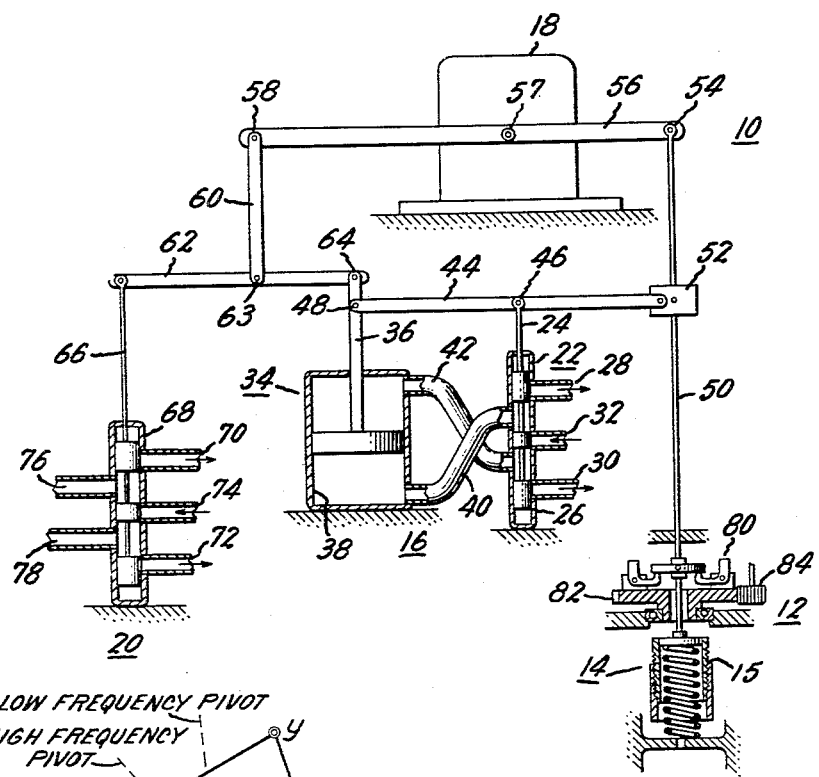
Figure 1 is a schematic view, partly in section, of a preferred embodiment of the invention.

Referring now to the drawings, there is shown in Figure 1, a preferred embodiment of a governor 10 comprising a flyweight mechanical speed sensor 12 having a spring speed reference 14 coupled thereto, and a mechanical-hydraulic lead-lag compensating circuit 16 mechanically coupled to the speed reference. A torque motor, or solenoid means 18, adapted to provide electrical trim or bias to the circuit 16, and a main control valve 20 are operatively associated with the speed reference 14. The valve 20 is adapted to supply oil flow to the governed unit, not shown, and used, for example, to control the air flow to an air turbine or to control the stroke or displacement of a hydraulic constant speed drive.

The preferred embodiment 10 provides basic mechanical-hydraulic zero steady-state speed error control, and the lead-lag compensating circuit 16 provides for increased system performance by compensating for basic drive time constants. The electrical trim 18 provides a means for applying an electrical signal from a load division electrical circuit, not shown, which is necessary for parallel of alternator drive systems. Of course, additional electrical signals may also be introduced, if desirable, such as remote speed adjustments, and the like. Hence, the governor 10 provides an extra pilot valve 22 comprising a three-lands valve stem 24 operatively coacting with a valve sleeve 26 provided with suitable drain conduits 28 and 30, and a high pressure oil supply conduit 32, from a conventional high pressure oil supply source, not shown. A hydraulic actuator 34 is also provided between the flyweight speed signal input at sensor 12 and the main control pilot valve 20, and comprises a piston rod 36 slideably coacting within a cylinder 38 which is hydraulically coupled to the pilot valve 22 by means of conduits 40 and 42.

The mechanical-hydraulic lead-lag compensating circuit 16 consisting of the pilot valve 22 and the hydraulic actuator 34, is coupled by a pivoting linkage to the flyweight mechanical speed sensor 12. This coupling linkage comprises a connecting link 44 pivotally coupled to the valve stem 24, at pivot point 46, and further coupled to the piston rod 36 at pivot point 48. The flyweight mechanical speed sensor 12 is provided with an extended shaft 50 having a coupling plate 52 fixed thereto and which is pivotally coupled to the link 44 to be operatively coupled to the lead-lag valve circuit 16.

The shaft 50 is coupled at pivot point 54 to a pivoting link 56 pivotally mounted to the output of the torque motor 18, at pivot point 57, to provide electrical trim or bias to the governor 10. The link 56 is extended and operatively coupled at pivot point 58 to a link 60 operatively coupling the torque motor 18 to the mechanical-hydraulic lead-lag compensating circuit 16 and to the main control valve 20. This structural relationship is achieved by pivotally coupling the link 60 to a link 62, at pivot point 63, which, in turn, is pivotally connected to the piston rod 36 at pivot point 64. The link 62 is extended to be pivotally coupled to a valve stem 66 to complete the linkage system of the governor.

The main control valve 20 comprises a three-landed valve stem 66 slideably coacting with a sleeve 68 which is provided with drain conduits 70 and 72 and with a high pressure fluid supply conduit 74, from a conventional high pressure fluid source, not shown. The valve sleeve 68 is further provided with conduits 76 and 78 hydraulically coupling the main control valve to the governed unit, for example, a stroking mechanism for a variable displacement hydraulic pump or a fuel flow metering system controlling fuel flow to a gas turbine. Of course, it will be obvious that the governed unit may be actuated by sensors responsive to speed, pressure, or temperature, or combinations thereof.

The flyweight mechanical speed sensor 12 comprises the spring speed reference 14 operatively engaging the shaft 50 and provided with an adjustable spring limiting device 15 to control the specific speed limits to be imposed on the governor 10. Specifically, the shaft 50 is coupled to a flyweight 80 pivotally mounted on a suitable gear 82 which, in turn, is coupled through a gear pinion 84 to the output speed of the governed unit, not shown. Of course, it will be understood that the speed sensor 12 may be of any conventional structural configuration and not limited to the specific illustrated structure. The torque motor, or solenoid means, 18 for electrical trim or biasing of the governor 10 comprises a conventional torque motor or solenoid means wherein the specific construction thereof does not form a part of the present invention. However, the application of a solenoid or torque motor 18 as a means of electrically trimming the basic speed control is an integral part of the present invention.

In the operation of the preferred embodiment of the governor 10, the addition of a mechanical-hydraulic lead-lag compensating circuit 16 is designed to give a certain time lag so that different ratios of speed input signals at 12, transmitted to the main control valve output 20 will be provided depending upon the rate-of-change of the speed. Accordingly, this provides the necessary lead function or anticipation to the governor 10 giving it faster response and allowing for improved accuracy of control. Electrical signals may also be introduced by force biasing the speed reference in the system with the solenoid or torque motor 18 actuating the linkage 56 and the related linkage operatively associated therewith. In this manner, the basic control is mechanical-hydraulic with electrical trim, as desired, for paralleling signals or additional trimming signals, if such is deemed desirable in the system.

Specifically, the speed input through pinion 84 rotates gear 82 which pivotally supports centrifugally responsive flyweight elements 80 which, in turn, are actuated in an amount proportional to the varying speed input. Actuation of the flyweight elements 80 axially displaces shaft 50 between the axial limits determined by the spring limiting element 15 to control the speed input range. Displacement of the shaft 50 causes the links 44 and 56 to pivot about pivot points 48 and 57, respectively. Due to the hydraulic stiffness of the actuator 34, relative to the valve stem 24, the link 44 will pivot about the pivot point 48. In this manner, the mechanical-hydraulic lead-lag compensating circuit 16, as a unit, will not be sensitive to fast responses due to sudden speed increases and will thereby compensate the system for basic drive time constants and increases the efficient performance of the governor 10.

Hence, since the circuit 16 is not sensitive to fast responses due to sudden speed increases, the system will have a certain time lag so that different ratios of speed input signal to the main control valve output will be provided, depending on the rate-of-change of the system's speed. Accordingly, this provides the lead function for anticipation to the governor 10 giving it faster response and allowing for improved accuracy of control. However, it can be seen that if the link 44 pivots about the pivot point 48, the valve stem 24 will be axially displaced so that high pressure fluid entering through the conduit 32 will flow through conduit 40 or 42, depending on the direction of the valve stem displacement, to bring in fluid to the actuator 34 to slideably displace the piston rod 36.

Consequently, actuation of the piston rod 36 will move the pivot point 64, about which the link 62 pivoted at the time the shaft 50 was initially displaced, so that the link 62 will be angularly displaced about the pivot point 63 in accordance with the range of speed ratios and time constants desired and incorporated into the linkage. Pivoting of the link 62 about pivot point 63 will axially displace valve stem 66 to control the flow of high pressure fluid from the supply conduit 74 to either of the output conduit 76 or 78 to predeterminedly govern the speed of the system. After the link 62 has been initially pivoted by the translated axial displacement of the shaft 50, the displacement of the piston rod 36, after a predetermined lag, will change the pivot point 64 to vary the ratios of speed input signal to the main control valve output depending upon the rate of change of the speed.

If deemed desirable, electrical signals may be introduced through the torque motor 18 to force bias the speed reference, transmitted through the shaft 50, by imposing an additional force biasing element of the system to pivot the link 56 accordingly. Thus, an electrical trim is provided for applying an electrical signal from a load division circuit, not shown, which parallels the speed reference to the main control valve 20.

In conclusion, the lead-lag valve-piston method disclosed in the present invention gives very consistent operation and response for very wide ranges of speed ratios and time constants for a given governed unit or drive. Also, the invention is easily adaptable for use with other types of signal sensoring devices, such as for pressure and temperature. Finally, the governor 10 can operate entirely by mechanical or electrical input signals, or a combination of both, as can be seen from the structural configuration disclosed in Figure 1.

Figure 4:
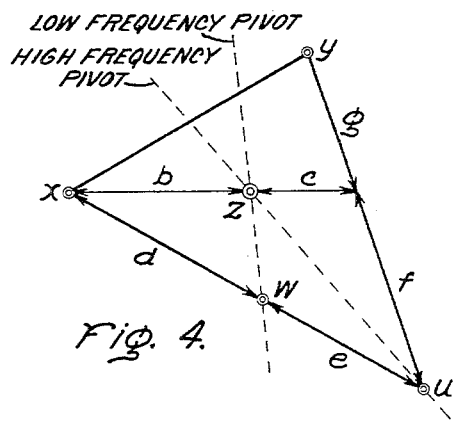
Figure 4 is a diagrammatic view of the link mechanism of the modification of Figures 2 and 3.

Figures 2 through 4 illustrate another embodiment of the present invention, wherein a more compact structural system is illustrated having a single link instead of the several links as disclosed in the preferred embodiment of the governor 10. The embodiment 90 comprises a gearing arrangement 92 coupled to the output speed of the governed unit, not shown, and serving as the speed input to a flyweight mechanical speed sensor 94. The speed sensor will axially displace the pivoting point 95 which is universally connected to a link 96 replacing the plurality of links utilized in the preferred embodiment.

The link 96 is pivotally coupled to a network pilot valve 98, at a connecting point 100, and to a network piston 102, through a connecting point 104, which substantially correspond to valves 22 and 34 of the governor 10, in function and structure. The link 96 is pivoted at 97 which serves as the central pivoting point for the link when biased by the speed sensor 94 and the mechanical-hydraulic lead-lag compensating network of 98 and 102, or additionally biased by a solenoid means for electrical trim or biasing of the system as disclosed in the preferred embodiment of the governor 10. If desired, the link 96 may be mounted on a flexure member 99 which coincides with the pivot 97 and is adjustable in a plane perpendicular thereto, so that variable linkage ratios may be obtained. Further, the linkage ratios may be suitably adjusted so that, if desired, a lead-lag compensating circuit may be obtained in the system.

A main pilot control valve 108 is provided in the embodiment 90, responsive to the movement of the link 96 to control oil flow to the governed unit in accordance to a predetermined linkage ratio. The desired linkage ratios and time constants of the link 96 can be determined by an equation representing the relationship of the triangular link shown in Figure 4, wherein the low frequency pivot and high frequency pivot are designated. For steady state or very slow reference signals, the link 96 hinges about the central pivot point 97 and connecting point 100 of the network pilot valve 98. For very fast and large inputs, the network piston does not have time to move so that the link hinges at the connecting point 104 of the network piston 102 and at the pivot point 97 to give very large motions to the main valve 108 to thereby correct the governed unit much faster for the large transients indicated.

Accordingly, the link ratios and time constants of the link 96 can be determined by using the following equation with particular reference to Figure 4, wherein the components of the equation are illustrated as a function of the structural dimensions of the link and of the flow through the network pilot valve 98:

$$\frac{\text{Valve motion}}{\text{Flyweight input}} = \frac{\Delta Y}{\Delta X} = \frac{\frac{1}{bf}\left(C(g+f) - \frac{beg}{d}\right)\left(\frac{\frac{e+d}{dK_n} \cdot p + 1}{1 - \frac{beg}{cd(g+f)}}\right)}{\frac{e+d}{dK_n} \cdot p + 1}$$

wherein the various link dimensions are indicated on Figure 4, and where $$K_n = \frac{\text{network pilot valve flow gradient}}{\text{network piston area}}$$

$p = \frac{d}{dt}$ = differential operator.

$a$ through $g$ = link dimensions.
$Y$ = main control valve movement.
$X$ = flyweight input movement.
$W$ = network pilot valve movement.
$U$ = network piston movement.

The operation of the embodiment 90 illustrated in Figures 2 through 4, is substantially the same as the operation of the preferred embodiment of the governor 10. If provision is desired for an electrical trim to apply, for example, an electrical signal from a load division type circuit for paralleling of an alternator drive system, additional electrical signals may be introduced through a solenoid, not shown, structurally fixed upon the link 96 and axially attached to the network pilot valve 98 to parallel the mechanical-hydraulic lead-lag compensating network of 98 and 102.

In conclusion, the present invention discloses a governor with positive valve-piston linkage lead-lag network as an integral part of the governor. Also, a linkage arrangement is illustrated wherein the compensating circuit and electrical trim, if utilized, are connected together to facilitate adjustment of constants by simple pivot location modification. In this manner, high performance characteristics are provided for a wide range of operating conditions while still utilizing the working fluid of the governed unit, which, very desirably, varies with load. Thus, the governing system does not require an additional oil pump and thereby further reduces the complexity and cost of the system.

The present invention also provides for electrical trim at desired locations in the specific network of the embodiments. Further, by mounting the link 96 on an adjustable flexure pivot 97, as shown in Figure 2, variable linkage ratios are also obtainable to further increase the over-all application of the present invention. Further, the present invention is ideally suited for the application of a crystal or ceramic electric actuator in place of the solenoid or torque motor illustrated or disclosed herein. In place of speed signals as the input, the disclosed flyweight units can be replaced with pressure sensing bellows so that the system will respond and govern in accordance to pressure input signals.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention as set forth in the appended claims.

What is claimed is:

1. A speed governor for producing an output signal as a complex function of speed error comprising speed reference means establishing a preselected speed reference level, means for producing a speed error signal proportional to the difference between the governor input speed and said preselected speed reference level, a pilot valve, an actuator hydraulically coupled to said pilot valve, and linkage means connected at one point thereof to said error signal producing means and providing a mechanical output signal at another point thereof, said linkage means being interconnected at two other points thereof to said pilot valve and said actuator to provide actuator position feedback to said pilot valve and produce a time lag in said linkage means, said linkage means being connected to provide a first signal proportional to magnitude of said speed error signal and a second signal proportional to the magnitude of said speed error signal through said time lag and opposite in direction to said first signal, whereby the output of said linkage is proportional to the difference between said first and second signals.

2. A speed governor for providing an output signal as a complex function of speed error comprising speed reference means establishing a preselected speed reference level, means for producing a speed error signal proportional to the difference between the governor input speed and said preselected speed reference level, a pilot valve, an actuator hydraulically coupled to said pilot valve, and a linkage element mounted on a universal pivot at one point thereon, said linkage element being connected at a second point thereon to said error signal producing means and providing a mechanical output signal at a third point thereon, said linkage element being connected at a fourth point thereon to said pilot valve and at a fifth point thereon to said actuator to provide actuator position feedback to said pilot valve and thereby produce a time lag, whereby said linkage element may be pivoted about said universal pivot point and said actuator connection point to provide a first signal proportional to the magnitude of speed error, the resulting movement of said actuator in resetting said pilot valve providing through said time lag a second signal proportional to the magnitude of speed error, whereby the output of said linkage element at said mechanical output point is proportional to the difference between said first and second signals.

(References on following page)

References Cited in the file of this patent

UNITED STATES PATENTS

| | | |
|---|---|---|
| 1,709,689 | Staege | Apr. 16, 1929 |
| 1,711,066 | Smoot | Apr. 30, 1929 |
| 1,814,631 | Ray | July 14, 1931 |
| 2,005,773 | De Florez | June 25, 1935 |
| 2,015,861 | Mitereff | Oct. 1, 1935 |
| 2,020,847 | Mitereff | Nov. 12, 1935 |
| 2,175,874 | Caughey | Oct. 10, 1939 |
| 2,489,586 | Ray | Nov. 29, 1949 |
| 2,630,814 | Daniel | Mar. 10, 1953 |
| 2,737,962 | Almeras | Mar. 13, 1956 |

FOREIGN PATENTS

| | | |
|---|---|---|
| 383,006 | Great Britain | Nov. 10, 1932 |